United States Patent [19]

Hasquenoph et al.

[11] 4,168,046
[45] Sep. 18, 1979

[54] AUTOMATIC WEDGING DEVICE FOR AIRCRAFT JETTISON LOADS

[75] Inventors: Jean H. Hasquenoph, Lagny; Pierre F. Coutin, Paris, both of France

[73] Assignee: R. Alkan & Cie, Valenton, France

[21] Appl. No.: 862,877

[22] Filed: Dec. 21, 1977

[30] Foreign Application Priority Data

Jan. 3, 1977 [FR] France ............... 77 00011

[51] Int. Cl.² .................... B64D 1/02
[52] U.S. Cl. ............... 244/137 R; 89/1.5 B; 89/1.5 G; 294/83 R
[58] Field of Search ............ 244/137 R, 118 R; 89/1.5 R, 1.5 A, 1.5 B, 1.5 F, 1.5 G, 1.5 C; 294/83 R, 83 A, 83 AA, 83 AB

[56] References Cited

U.S. PATENT DOCUMENTS

| | | | |
|---|---|---|---|
| 2,010,511 | 8/1935 | Crawford | 89/1.5 B |
| 2,526,903 | 10/1950 | Ruppert | 89/1.5 B |
| 3,670,620 | 6/1972 | Paraskewik | 89/1.5 B |
| 3,854,680 | 12/1974 | Hasquenoph et al. | 244/137 R |
| 3,954,233 | 5/1976 | Hasquenoph et al. | 244/137 R |
| 4,008,645 | 2/1977 | Herbert | 89/1.5 G |
| 4,122,754 | 10/1978 | Panlaqui | 89/1.5 B |

*Primary Examiner*—Galen L. Barefoot
*Attorney, Agent, or Firm*—William Anthony Drucker

[57] ABSTRACT

This automatic wedging device for operating each ejector of loads carried under an aircraft for jettisoning comprises at least one actuator of the cylinder-and-piston or worm-and-wheel type adapted to transmit a wedging force to a pair of symmetrical load-engaging wedging levers, and a device for automatically operating each actuator when the load is properly positioned in relation to the aircraft; other devices are provided for locking the wedging levers when this force has attained a predetermined value and restoring the wedging levers to their inoperative position after the load has been jettisoned as a consequence of the opening of the load suspension hooks.

14 Claims, 8 Drawing Figures

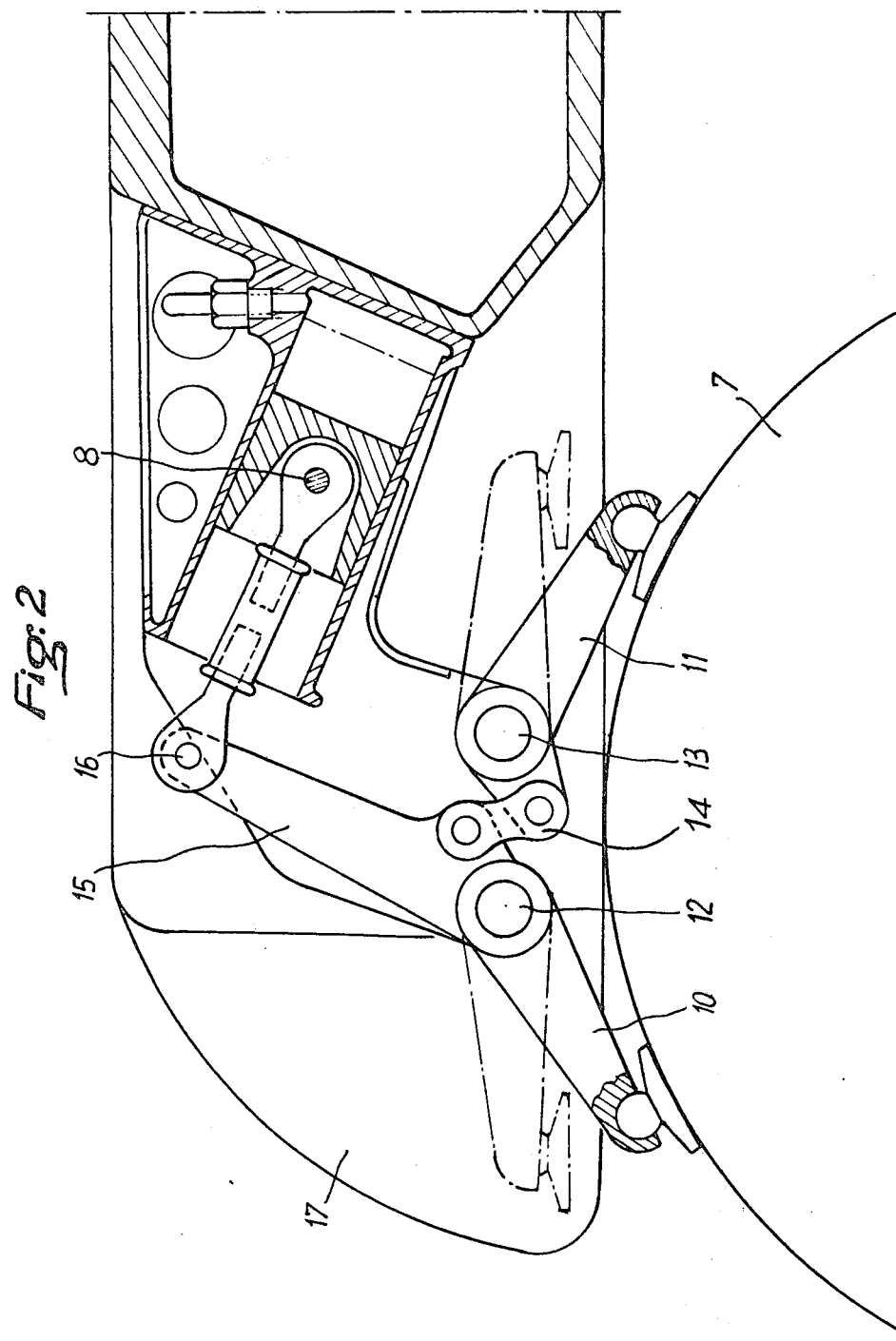

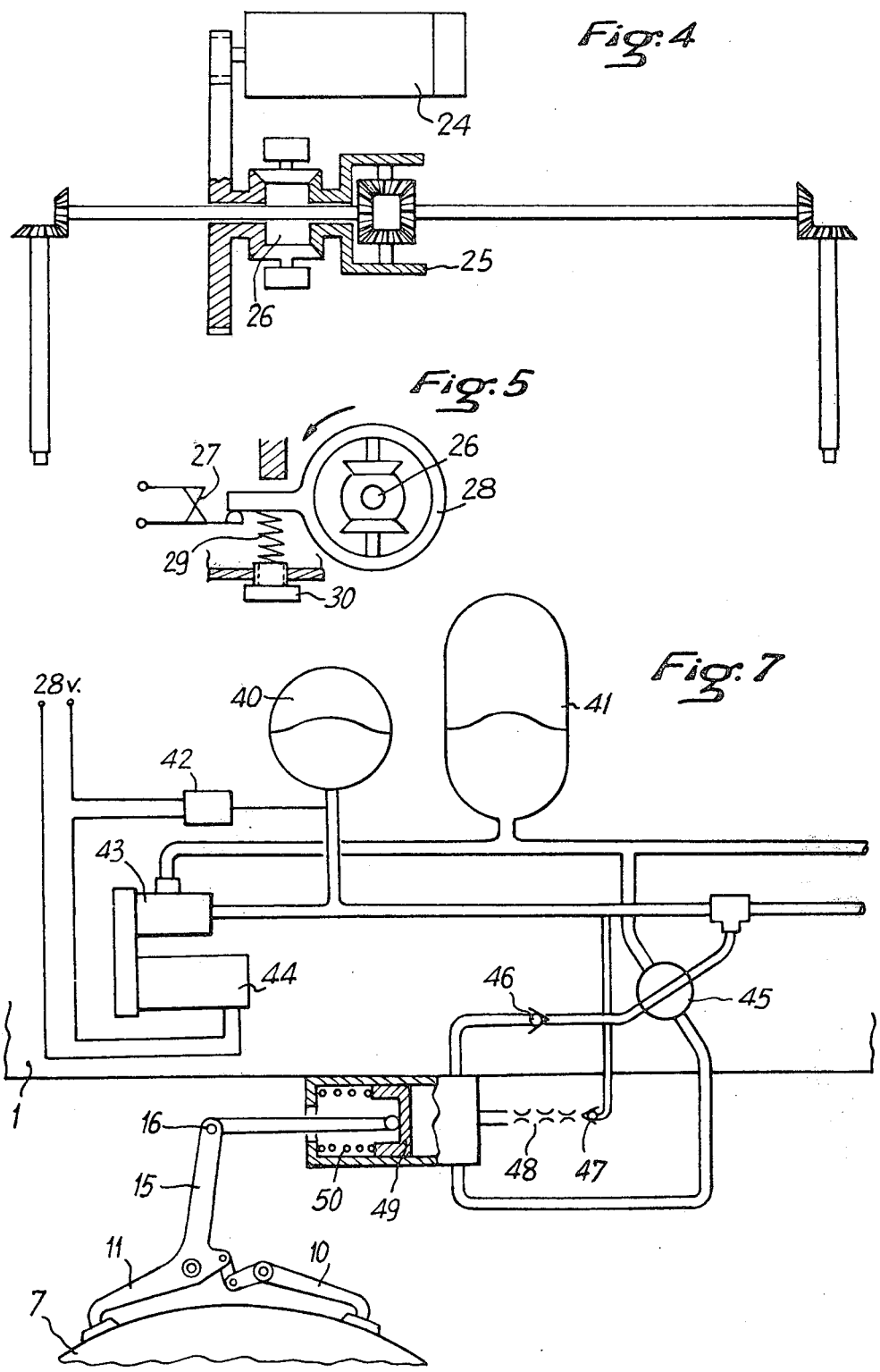

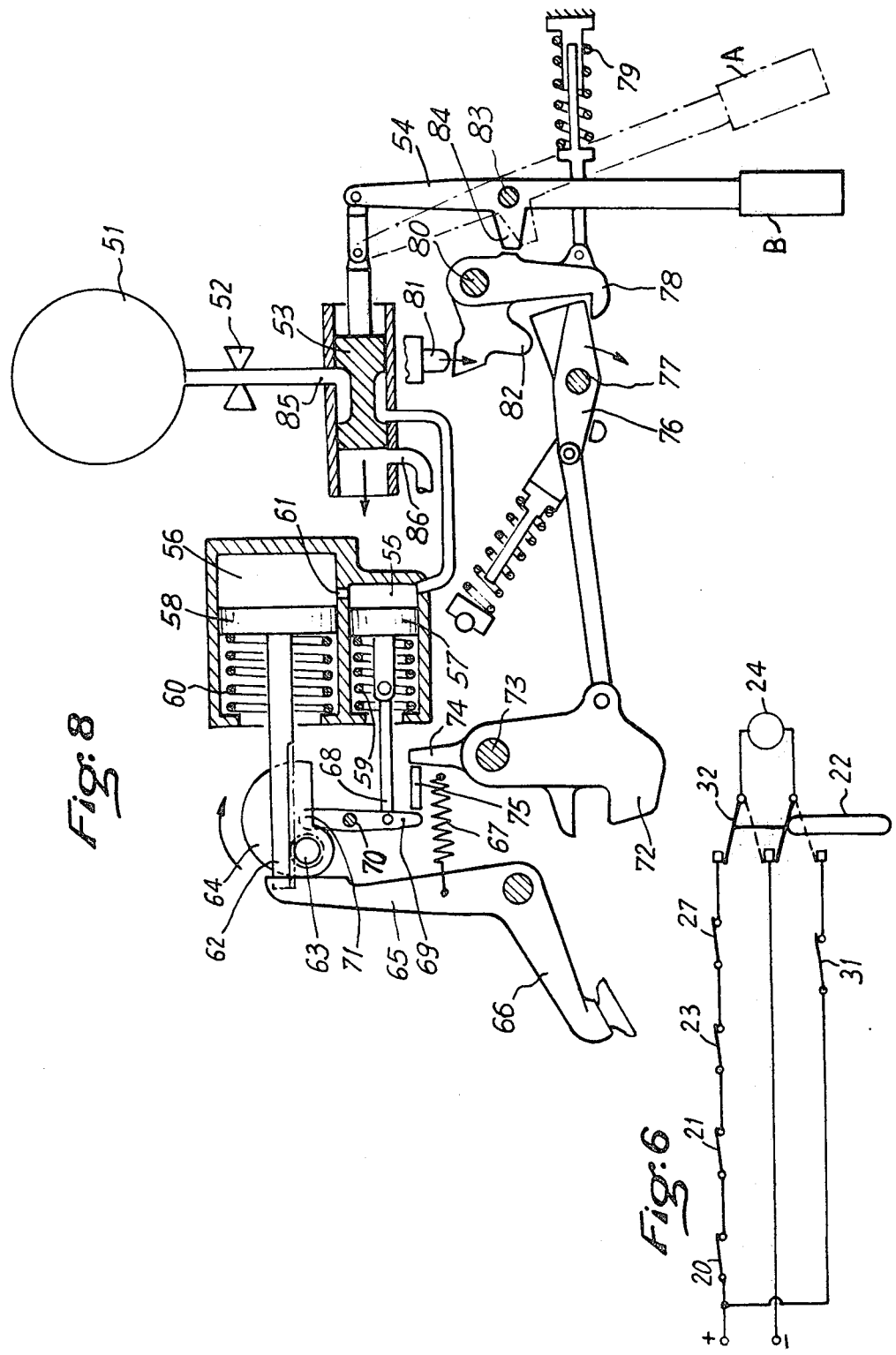

AUTOMATIC WEDGING DEVICE FOR AIRCRAFT JETTISON LOADS

BACKGROUND OF THE INVENTION

1. Field of the Invention

The present invention relates in general to devices for wedging and jettisoning loads carried under the wings or fuselage structure of aircrafts, and has specific reference to improvements in or relating to devices of this character.

2. Description of the Prior Art

It is known that aircrafts equipped with external load transport means are frequently provided with adaptors for transporting a plurality of small loads in lieu of a single heavier load.

As a rule, these adaptors comprise a frame structure or bracket units associated with a plurality of release devices or ejectors including the conventional means for supporting, wedging and ejecting the loads. This structure further comprises the means necessary for fixing and wedging the load, together with the electric appliances necessary for controlling and actuating the ejectors.

Wedging or fixing the various loads involves a number of manoeuvres and of course it is essential that the time required therefor should be kept within reasonable limits.

DESCRIPTION OF THE INVENTION

It is the essential object of the present invention to wedge each load automatically in order to eliminate relatively long and tedious manual operations. For this purpose, electro-mechanical or hydro-pneumatic means may be used according to this invention, either of them being incorporated in the frame structure of the adaptor and adapted to actuate automatically the load fixing clamps immediately as the loads are anchored or suspended. Pneumatically operated mechanical means have also been contemplated within the scope of the present invention.

In order to avoid any complicated ejector design and afford the use of standard ejectors, and according to a specific feature of the present invention, the frame members provided for fixing the ejectors are also used for pivotally mounting, controlling and retracting after the jettisoning operation the wedging clamps, according to the arrangement illustrated in the attached drawing.

BRIEF DESCRIPTION OF THE DRAWING

FIG. 2 is a cross section showing the adaptor mounted on a frame member;

FIGS. 4 and 5 are diagrammatic sectional views showing details of the device illustrated in FIG. 3;

FIG. 6 is a wiring diagram concerning the electric system of the device;

FIG. 7 is a diagrammatic view showing a hydropneumatic version of the wedging device according to this invention; and FIG. 8 is a diagrammatic view of the mechanical wedging device of this invention with its pneumatic actuating means.

DESCRIPTION OF THE PREFERRED EMBODIMENTS

Figure 1:
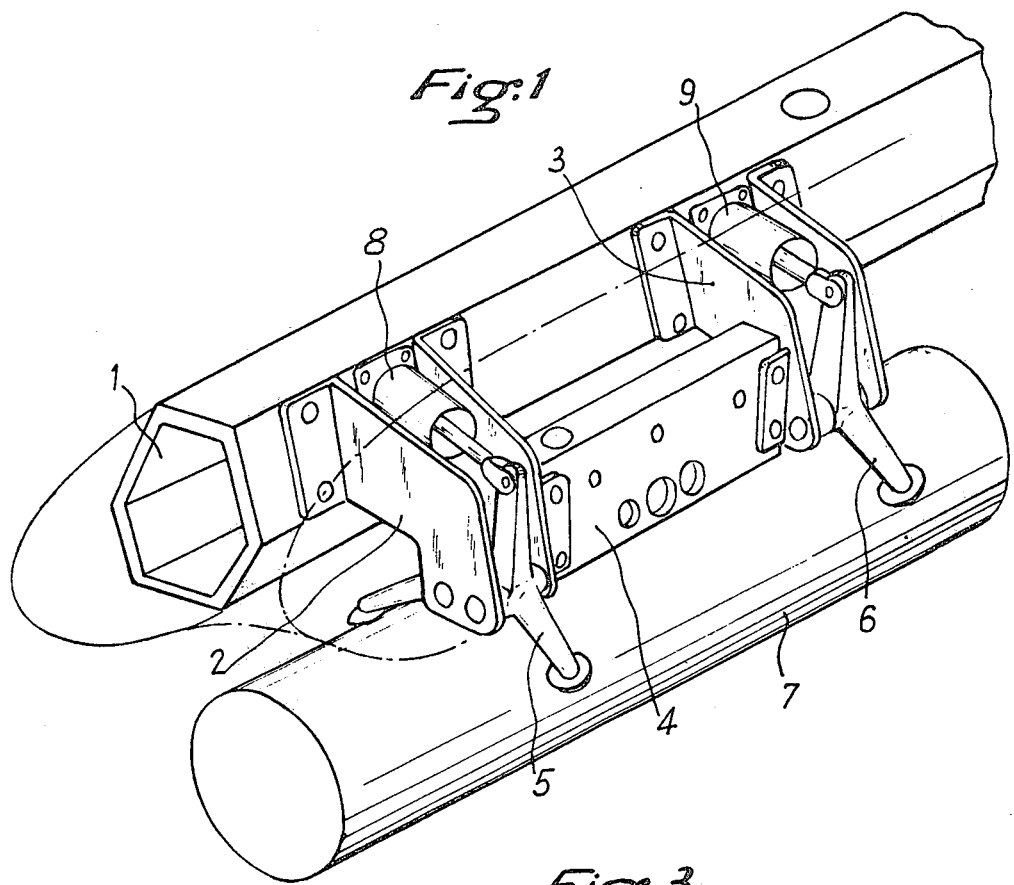
FIG. 1 is a fragmentary and perspective view of an adaptor to which the present invention is applicable.

Reference is made now to FIG. 1 of the drawing which illustrates by way of example a longitudinal hollow core 1 of an adaptor, and bracket means 2, 3 for fastening detachable ejector 4. It is clear that a similar arrangement symmetrical in relation to the core 1 may be provided for operating another ejector and that a plurality of pairs of ejectors may thus be secured and disposed at spaced intervals along the beam comprising the core 1 of the adaptor. The reference numerals 5 and 6 designate the clamps for wedging the load 7 suspended from the ejector 4 and reference numerals 8 and 9 designate the mechanical or hydraulic means for actuating these clamps, said means being of any suitable and known type.

In the FIG. 2 the reference numerals 10 and 11 designate two-armed levers fulcrumed on pins 12 and 13, respectively, of the clamps shown diagramatically at 5 and 6 in FIG. 1. These levers are operatively interconnected by a link 14. The arm 15 of lever 10 is operatively connected at 16 to the movable member of actuator 8. The levers 10 and 11 are adapted to retract automatically within a fairing 17 when the load 7 has been jettisoned.

Figure 3:
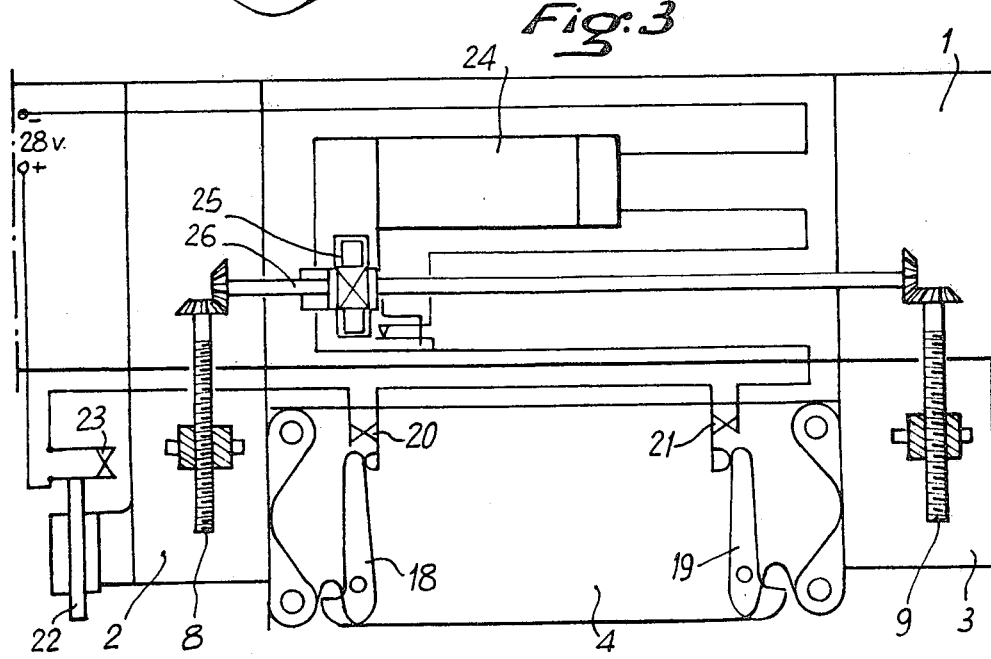
FIG. 3 is a diagrammatic view illustrating the electromechanical wedging device according to this invention.

In the FIG. 3 the reference numerals 18 and 19 designate the load retaining hooks forming an integral part of the ejector mechanism 4 of which the other known component elements are not shown. In the closed position these hooks 18, 19 or elements rigid therewith close electric switches 20 and 21. A feeler 22 carried by one of the pair of frame members 2 or 3 is adapted to close another electric switch 23 when the load is supported by the device. Internally, for example in the hollow core 1 of the adaptor, is an electrical motor/brake/reducer unit. The motor 24 is coupled to the pair of actuators 8, 9, illustrated in this example as consisting of worm and wheel gears, via a mechanical transmission including a differential 25 and a torque measuring device 26, both of known type. The torque measuring device shown only diagrammatically in FIG. 5 is adapted to keep a switch 27 closed until a predetermined torque value is attained, this switch being opened by the device 26 when this torque value is reached. The motor 24 is energized in the direction to actuate clamps 5 and 6 only when all the series-connected switches 20, 21, 23 and 27 are closed.

The above-described device operates as follows. The load 7 is hoisted as customary so that its suspension rings engage the hooks 18 and 19 adapted to be closed either automatically or manually according to known procedures. When the load is properly suspended from the hooks 18 and 19, switches 20, 21 and 23 are closed automatically, namely switches 20 and 21 as a consequence of the closing movement of said hooks, and switch 23 by the presence of the load positioned in the device. When these requirements are met, the motor 24 is energized to actuate the gears or cylinders 8 and 9, the differential 25 causing the clamping torque to be equally shared among the two actuators. The magnitude of this torque is necessarily subordinate to the nature of the specific load to be carried and also to the prevailing flying conditions. It may be pre-adjusted on the ground by means of the torque measuring device 26 shown in FIG. 5, strictly by way of example, not of limitation, in the form of a differential of which the outer ring 28 urged in the direction of the arrow is adapted to compress a coil spring 29. The tension of this torque-balancing spring may be modified at will by more or less tightening the screw 30. The torque value may be read on a graduated dial or vernier. When the selected torque value is obtained, the compression of spring 29 opens switch 27, thus de-energizing the motor 24. Since this system is irreversible, the automatic wedging requirement is met without any intervention from the operator.

When the load is jettisoned, switches 20, 21 and 23 open. At this time, it is also possible to operate the motor 24 in the opposite direction through the action of feeler 22 having resumed its lower position in a reversing switch 32, as shown in the wiring diagram of FIG. 6. Thus, the clamps are retracted automatically within the aerodynamic fairing 17. A limit switch 31 is adapted to de-energize the motor 24 when this position is attained. It will be seen that in this retraction operation since the direction of rotation of the motor is inverted the torque measuring device is also urged in the opposite direction and switch 27 is closed, so that the cycle may be resumed.

In the FIG. 7, the hollow core 1 of the adaptor is shown diagrammatically as in the case of FIG. 1; this core 1 encloses the power and driving component elements which are of known type but so combined, according to a diagram to be described presently, that the load can be wedged automatically. The reference numeral 40 designates a high-pressure hydraulic accumulator, and the assembly comprises a low-pressure hydraulic accumulator 41, a pressure responsive switch 42, a hydraulic pump 43 preferably of the barrel type, an electric motor 44, a two-way valve 45, non-return valves 46 and 47, and a dashpot 48 of the thermal expansion limiting type. In the frame members already shown at 2 and 5 in FIG. 1, hydraulic cylinder and piston actuators such as 49, substituted for the mechanical gears of FIG. 1, are provided for actuating similarly the wedging clamps 10 and 11, said actuators being equipped with return springs 50.

This device operates as follows: assuming that the load is suspended from the hooks of the device and valve 45 in the position shown in FIG. 7 as a consequence of the closing of the hook means, the high-pressure accumulator communicates with actuators such as 49. On the other hand, the hydraulic barrel pump driven by motor 44 provides relevant hydraulic pressures in accumulators 40 and 41. It will be seen that the hydraulic device operates under closed-circuit conditions and that the pump is supplied with fluid from the low-pressure accumulator. The degree of clamping force exerted by the wedging levers 10 and 11 is predetermined, as in the electro-mechanical version of the present invention, by means of a preliminary adjustment or setting. The operation of motor 44 is discontinued under the control of the pressure responsive switch 42 when the preselected high-pressure value is attained. When jettisoning the load, one element of the ejector mechanism actuates the plug of valve 45 in order to cut off the communication between the actuator and the high-pressure accumulator 40 and open the communication with the low pressure accumulator 41. Thus, the spring 50 pulls back the wedging levers 10, 11.

The temperature differentials to which aircrafts are generally exposed may, through the corresponding expansion of the liquid (generally oil of the type utilized in hydraulic systems), gradually produce considerable variations in the initial pressure of the actuators. Therefore, regulation means are contemplated so that a very low output leak will enable the excess oil corresponding to the overstepping of the desired pressure to resume its previous high pressure. Inversely, when the temperature drop causes the pressure to decrease, the pressure responsive switch 42 becomes operative and pump 43 is actuated. Finally, the purpose of non-return valve 46 is to cause the actuation of the clamping members in the clamping direction to become irreversible as long as the load is carried by the aircraft. The function of non-return valve 47 is to prevent a permanent application of high-pressure fluid to actuator 49.

In the FIG. 8, there is shown at 51 a compressed gas reservoir, at 52 an adjustable pressure reducing device, and at 53 a slide-valve distributor responsive to a safety lever 54. This lever 54 adapted to be actuated manually at rest, i.e., on the ground has several functions, as will be explained presently. Slide-valve distributor 53 is provided for causing the air reservoir 51 to communicate with a pair of cylinders 55 and 56 in which pistons 57 and 58 are slidably mounted, respectively, and associated with return 59 and 60. It will be noted that cylinders 55, 56 are interconnected by a small orifice 61. Piston 58 has a rack-forming extension 62 meshing with a toothed pinion 63 rigid with a cam 64. This cam 64 of the gradually increasing radius type and engages the arm 65 of a two-armed load-clamping lever 66 urged by a traction spring 67. Piston 57 is connected via a rod 68 to a two-armed straight lever 69 fulcrumed on a fixed pivot pin 70 and provided with a toothed upper end 71 in meshing engagement with said pinion 63. One of the load retaining hooks is shown at 72. This hook 72 is fulcrumed on a fixed pivot pin 73 and comprises an unstanding lug 74 adapted to actuate said lever 69 through a push rod 75. Furthermore, this hook 72 is connected to a step-down mechanism of known type of which the end member 76 fulcrumed at 77 is adapted to be latched by a latch or retaining member 78 urged to its latching position by a spring 79 and fulcrumed on a fixed pivot pin 80. As conventional, this latch member 78 may be released from its latching position for rotation in the direction shown by the arrow by some suitable pyrotechnical or other means 81; due to the action exerted by the heel 82 of member 78 rotating about the fixed pin 80, said end member 76 pivots in the direction of the arrow about the fixed pivot pin 77, thus retracting the hook 72 which pivots about the pin 73. Finally, the safety lever 54 fulcrumed on the fixed pin 83 comprises a heel portion 84 preventing the backward movement of retaining member 78. This lever 54 when brought to the position shown in FIG. 8 determines the full engagement of members 76 and 78; the position of the slide valve 53 of the distributor is also shown in FIG. 8.

This device operates as described hereinafter. In order to permit the proper anchorage of the load and the mutual latching of members 76 and 78, the safety lever 54 is moved preliminarily to position A, shown in phantom lines in FIG. 8. Thus, slide valve 53 is moved in the direction of the arrow, thus closing the compressed gas inlet port 85 and venting the cylinders to the atmosphere via port 86. Before anchoring the load, the hooks such as 72 being necessarily open, heel 74 will actuate push rod 75 in the direction causing the toothed end 71 of lever 69 to be disengaged from pinion 63 so as to move the clamps 66 to their fully open position. It is clear that, due to the force of spring 60, piston 58 and its rack 62 will move to the right as seen in FIG. 8, thus causing the cam 64 to rotate in the direction of the arrow, whereby the arm 65 of clamp 66 will engage the smallest radius of cam 64. With the load hoisted and positioned in the conventional manner until the members 76 and 78 snappily move to their latching positions, the safety lever 54 is actuated to position B, in thick lines in FIG. 8, in order to produce a positive latching while moving the slide valve 53 to the position illustrated. Thus, the compressed air stored under pressure in reservoir 51 can flow towards cylinders 55 and 56. Piston 57 is thus moved against the force of spring 59 to cause the toothed end 71 of lever 69 to be disengaged from pinion 63. Piston 58, by moving against the force of spring 60, but with a certain time lag due to the reduced diameter of orifice 61, causes via its rack portion 62 and the thus released pinion 63 the counter-clockwise rotation of cam 64, as seen in FIG. 8. This cam 64, by gradually moving the arm 65 of clamp 66, causes the latter to engage the load and the higher the pressure exerted on piston 58, the stronger the clamping force exerted on the load. As in the other forms of embodiment described hereinabove, this clamping force is predetermined by setting the pressure reducing device 52 on the ground.

The load is thus safely locked in position, and to permit the jettisoning during a flight the safety lever 54 is moved back by the operators to its initial position A. Cylinder 55 is vented to the atmosphere and spring 59 causes pinion 63 to mesh again with the toothed end of lever 69. With a slight time-lag still due to the small diameter of orifice 61, the pressure also drops in cylinder 56. The irreversibility and locked condition of the clamping means are extremely positive as long as the toothed end 71 of lever 69 engages the teeth of pinion 63, i.e., as long as the load is supported by the device. These requirements are met irrespective of possible accidental air leaks in the pneumatic section of the device.

When jettisoning the load, the hooks are caused to open and the lug 74 actuates lever 69 to free pinion 63. Thus, spring 60 can move piston 58 and consequently its rack-forming portion 62 in such a way that cam 64 revolves in the direction of the arrow and therefore the clamp 66, urged by spring 67, as already explained in the foregoing, is fully raised and can retract within a suitable aerodynamic fairing.

Although specific forms of embodiment of the invention have been described hereinabove and illustrated in the accompanying drawing, it will readily occur to those skilled in the art that various modifications and changes may be brought thereto without departing from the scope of the invention as set forth in the appended claims.

What we claim is:

1. An adaptor, for suspension under an aircraft to permit the carrying and the jettisoning of a plurality of small loads in lieu of a single heavier load, comprising:
    a longitudinal hollow core for suspension from the aircraft,
    pairs of bracket means secured along said core, each pair of bracket means carrying an ejector equipped with suspension hooks for suspending a load disposed parallel to the longitudinal axis of the core,
    a pair of symmetrical wedging levers pivoted to each bracket means and disposed transversely in relation to the load, so that said wedging levers engage the outer surface of the load to ensure the wedging thereof,
    at least one mechanical actuator carried by each bracket means and connected to said wedging levers for transmitting a wedging force to said wedging levers,
    an electric motor carried by said core and connected to said actuators for the operation thereof,
    a feeler engageable by the load and adapted to automatically control said electric motor, when the load is properly positioned in relation to the aircraft;
    means associated with the suspension hooks and adapted to automatically control the electric motor when the load suspension hooks are closed,
    means for locking said wedging levers when said wedging force applied thereto has reached a predetermined value,
    and means for restoring said wedging levers to their inoperative position after said load has been jettisoned as a consequence of the opening of the load suspension hooks.

2. An adaptor, as claimed in claim 1, wherein a differential is provided between the electric motor and said mechanical actuators carried by said pair of brackets, in order to equalize the clamping forces applied to the pair of wedging levers associated with one bracket of said pair and to the pair of wedging levers associated with the other bracket of said pair.

3. An adaptor, as claimed in claim 2, wherein an adjustable torque measuring device is provided and is adapted to open an electric switch, in circuit with the electric motor, when the torque applied to a shaft controlling the wedging levers has attained a preset value, so as to stop the electric motor.

4. An adaptor, as claimed in claim 1, wherein when the load is jettisoned said feeler automatically engages an electric switch causing the electric motor to rotate in opposite direction in order to retract the wedging levers within a fairing of the adaptor.

5. An adaptor adapted for suspension under an aircraft to permit the carrying and jettisoning of a plurality of small loads in lieu of a single heavier load, comprising
    a longitudinal hollow core for suspension from the aircraft,
    pairs of bracket means secured along said core, each pair of bracket means carrying an ejector equipped with suspension hooks for suspending a load disposed parallel to the longitudinal axis of the core,
    a pair of symmetrical wedging levers pivoted to each bracket means and disposed transversely in relation to the load, so that said wedging levers engage the outer surface of the load to ensure the wedging thereof,
    at least one hydraulic cylinder-and-piston unit carried by each bracket means and connected to said wedging levers for transmitting a wedging force to these wedging levers,
    a high-pressure hydraulic accumulator connected to said hydraulic cylinder-and-piston unit through a two-way valve,
    a low-pressure hydraulic accumulator connected to said hydraulic cylinder-and-piston unit through said two way valve so that according whether the suspension hooks are in closed or open positon the two way valve connects the hydraulic cylinder-and-piston unit either to the high-pressure hydraulic accumulator or to the low-pressure hydraulic accumulator, respectively.
    means for locking said wedging levers when said wedging force applied thereto has reached a predetermined value, and means for restoring said wedging levers to their inoperative position after said load has been jettisoned as a consequence of the opening of the load suspension hooks.

6. An adaptor, as claimed in claim 5, wherein an adjustable pressure responsive switch is disposed between the high-pressure hydraulic accumulator and the hydraulic cylinder-and-piston unit to set the pressure of the hydraulic fluid.

7. An adaptor, as claimed in claim 5, wherein a barrel pump operating under closed-circuit conditions is connected to said high-and-low pressure hydraulic accumulators for producing the pressure of the hydraulic fluid.

8. An adaptor, as claimed in claim 6, wherein a barrel pump operating under closed-circuit conditions is connected to said high-and-low pressure hydraulic accumulators for producing the pressure of the hydraulic fluid.

9. An adaptor, as claimed in claim 5, wherein a regulating device of the dashpot type is provided for preventing overpressure due to thermal expansion of the fluid without any loss thereof.

10. An adaptor, as claimed in claim 6, wherein a regulating device of the dashpot type is provided for preventing overpressure due to thermal expansion of the fluid without any loss thereof.

11. An adaptor, as claimed in claim 7, wherein a regulating device of the dashpot type is provided for preventing overpressure due to thermal expansion of the fluid without any loss thereof.

12. An adaptor for suspension under an aircraft to permit the carrying and the jettisoning of small loads in lieu of a single heavier load, comprising:

a longitudinal hollow core for suspension from the aircraft, pairs of bracket means secured along said core, each pair of bracket means carrying an ejector equipped with suspension hooks for suspending a load disposed parallel to the longitudinal axis of the core, a pair of symmetrical wedging levers pivoted to each bracket means and disposed transversely in relation to the load, so that said wedging levers engage the outer surface of the load to ensure the wedging thereof, at least one main pneumatic piston-and-cylinder unit carried by each bracket means and connected to said wedging levers for transmitting a wedging force to said wedging levers, a compressed gas reservoir connected to said main pneumatic piston-and-cylinder unit, a distributor disposed between said compressed gas reservoir and said main pneumatic cylinder-and-piston unit and adapted to allow the passage of compressed gas from the reservoir to the main pneumatic cylinder-and-piston unit when the suspension hooks are in closed position, means for locking said wedging levers when said wedging force applied thereto has reached a predetermined value, and means for restoring said wedging levers to their inoperative position after said load has been jettisoned as a consequence of the load suspension hooks.

13. An adaptor, as claimed in claim 12, wherein said wedging levers are released automatically by opening the suspension hooks of the ejector.

14. An adaptor, as claimed in claim 12, wherein a further pneumatic cylinder-and-piston unit is disposed between said reservoir and said main pneumatic cylinder-and-piston unit, said further pneumatic cylinder-and-piston unit being connected to spring-actuated means for locking the wedging levers in their wedging position, so that by actuating said distributor when the suspension hooks are in their closed position the main pneumatic cylinder-and-piston unit is vented to the atmosphere while the wedging levers stay locked in their wedging positions.

* * * * *